United States Patent [19]

Bruning et al.

[11] 4,375,257

[45] Mar. 1, 1983

[54] HYDROGEN STORAGE AND SUPPLY DEVICE

[75] Inventors: Hugo A. C. M. Bruning; Johannes H. N. van Vucht; Frans F. Westendorp; Hinne Zijlstra, all of Emmasingel, Netherlands

[73] Assignee: U.S. Philips Corporation, New York, N.Y.

[21] Appl. No.: 174,465

[22] Filed: Aug. 1, 1980

Related U.S. Application Data

[60] Division of Ser. No. 895,000, Apr. 10, 1978, Pat. No. 4,242,315, which is a continuation of Ser. No. 673,220, Apr. 2, 1976, abandoned, which is a continuation of Ser. No. 247,454, Apr. 25, 1972, abandoned, which is a continuation of Ser. No. 867,811, Oct. 20, 1969, abandoned.

[30] Foreign Application Priority Data

Jan. 24, 1969 [NL] Netherlands .................. 6901276
Apr. 23, 1969 [NL] Netherlands .................. 6906305

[51] Int. Cl.$^3$ .................. F17C 11/00; F16L 55/04; B65D 25/00; C01B 1/26

[52] U.S. Cl. .................. 206/0.7; 34/15; 62/48; 220/88 R; 423/248; 423/648 R

[58] Field of Search .................. 206/0.7, 0.6; 220/88 R; 34/15; 62/48; 423/252, 248, 648

[56] References Cited

U.S. PATENT DOCUMENTS

| | | | |
|---|---|---|---|
| 2,928,529 | 3/1960 | Grosse et al. | 206/0.6 |
| 3,315,479 | 4/1967 | Wiswall, Jr. et al. | 34/15 |
| 3,375,676 | 4/1968 | Reilly, Jr. et al. | 34/15 |
| 3,452,503 | 7/1969 | Miller | 206/0.6 |
| 3,508,414 | 4/1970 | Wiswall, Jr. et al. | 62/48 |

*Primary Examiner*—William T. Dixson, Jr.
*Attorney, Agent, or Firm*—Norman N. Spain

[57] ABSTRACT

A hydrogen storage and supply device in which a pressure vessel contains a hydride of the gross formula $AB_nH_m$, in which A is calcium or one or more of the rare earth metals with or without thorium, zirconium, or hafnium, B is nickel and/or cobalt, with or without iron and/or copper, n has a value between about 3 and 8.5 and m has a value exceeding 0 and up to about 7.

3 Claims, 4 Drawing Figures

HYDROGEN STORAGE AND SUPPLY DEVICE

This application is a divisional of Ser. No. 895,000, filed Apr. 10, 1978 and now U.S. Pat. No. 4,242,315; which in turn was a continuation of Ser. No. 673,220, filed Apr. 2, 1976 now abandoned; which in turn was a continuation of Ser. No. 247,454, filed Apr. 25, 1972 now abandoned; which in turn was a continuation of Ser. No. 867,811, filed Oct. 20, 1969 now abandoned.

The invention relates to a compound of the gross formula $AB_nH_m$, in which A designates Ca or one or more elements of the rare earth metals, which may be combined with Th and/or Zr and/or HF, B designates Ni and/or Co, which may be combined with Fe and/or Cu, n has a value lying between about 3 and about 8.5 and m has a value which may rise to about 8.

The element Y is considered in this respect to belong also to the rare earths.

Such compounds are novel compounds and have the property that per quantity by weight of $AB_n$ a great quantity of hydrogen is bound. Moreover, with appropriate combinations of temperature and pressure they are capable of releasing rapidly the bonded hydrogen.

The table indicates a few examples of compounds $AB_nH_m$. It can be read from the Table which quantity of hydrogen is contained in these hydrides.

In the Table the symbol $La^M$ stands for technically pure La, ie. 85% by weight of La, 10% by weight of Ce, 5% by weight of a mixture of other rare-earth metals. The symbol Mm stands for "Mischmetall", i.e. >50% by weight of Ce, about 25% by weight of La, 25% by weight of a mixture of other rare-earth metals.

Said hydrides may be successfully used as storing media for hydrogen. The stored hydrogen can be released in a simple manner from the hydrides. Moreover, the hydrides may be used with very satisfactory results as reducing agents for reducing organic compounds.

The invention also relates to material for absorbing hydrogen gas with given combinations of hydrogen gas pressure and working temperature and for releasing hydrogen gas with other combinations, said material consisting of the compound $AB_n$ in powder form, in which A designates Ca or one or more of the elements of the rare earths, which may be combined with Th and/or Zr and/or Hf, and B designates Ni and/or Co, which may be combined with Fe and/or Cu and n has a value lying between about 3 and about 8.5.

Known examples of materials binding hydrogen gas in the form of hydrides or solutions are U, Pd, Zr, $Th_2Al$ etc. It is also possible to regain the hydrogen gas from the hydrides or solutions formed.

The capacity of such materials to absorb or release hydrogen gas depends upon the external hydrogen gas pressure and the working temperature.

The invention will be described with reference to the accompanying drawing in which.

Figure 1:
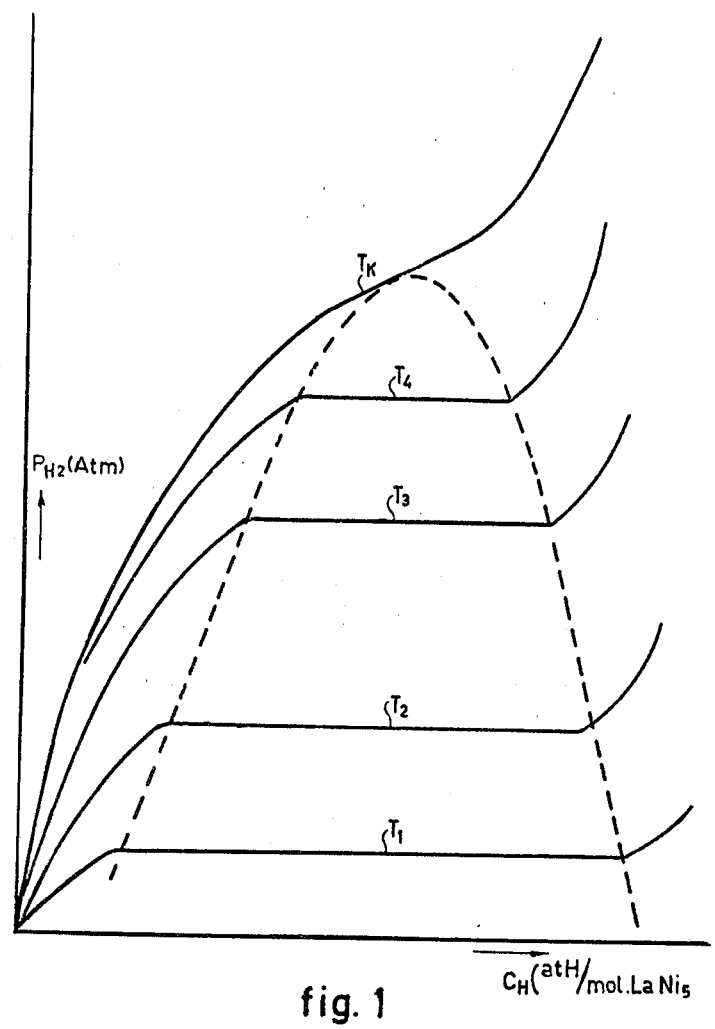
FIG. 1 is a graph showing isotherms of materials according to the invention, i.e. hydrogen pressure v. absorbed quantity of hydrogen at a given temperature.

This is explained with reference to the graph of FIG. 1. For each of said materials isotherms can be drawn in such a graph, in which the hydrogen gas pressure $PH_2$ is plotted on the ordinate and the absorbed quantity of hydrogen $C_H$ on the abscissa. Each isotherm (provided it is associated with a temperature lying below a critical temperature $T_k$) exhibits a horizontal course at a given pressure—the so-called "plateau". At the plateau-pressure the material can be caused with the aid of a small pressure variation to absorb comparatively large quantity of hydrogen gas or to release it in a reversible process.

From this graph 1, in which $T_1<T_2<T_3<T_4<T_k$, it can be read that according as the temperature T rises the plateau pressure increases and, moreover, the plateau becomes "shorter". Accordingly the capacity of absorbing and releasing hydrogen gas by a small pressure variation decreases.

In the book of Dallas T. Hurd: "An Introduction to the Chemistry of Hydrides", pages 180 and 181, a few combinations of hydrogen pressure and temperature are mentioned for $UH_3$, which correspond to plateau. For example, the following combinations are given:

Hydrogen pressure 32.5 mms; temperature 307° C.
Hydrogen pressure 134 mms; temperature 357° C.
Hydrogen pressure 1010 mms; temperature 444° C.

Said materials may be employed as hydrogen-pressure buffers at low pressures. The working temperatures are then comparatively high.

Furthermore these materials are used as agents for separating hydrogen gas from gas mixtures. The absorbed hydrogen can be regained from the hydride or from the solution in a very pure form. Also in this case it applies that the working temperatures i.e. the temperatures at which a suitable plateau-pressure is obtained are comparatively high. These working temperatures may be chosen lower, it is true, but the associated plateau pressure then drops to a frequently unserviceable low value.

Particularly if it is desired for the absorption and release of hydrogen gas to be performed with a technically suitable speed, at a pressure of, for example, 1 atmosphere, whereas the working temperature has to be approximately the room temperature, the aforesaid substances are not satisfactory.

It should be noted that Ni and/or Co may be partly replaced by a few other elements such as Fe, Cu, etc. without seriously affecting said favourable properties with respect to the absorption and release of hydrogen gas.

Apart from the said uses as buffers for low hydrogen pressures and as agents for separating out hydrogen from a gas mixture, and for releasing it subsequently in a very pure state, the material in accordance with the invention is particularly employed as a storing medium for hydrogen gas.

The specific advantages of the material in this respect as compared with known materials are:

1. At room temperature and at a hydrogen gas pressure of less than 100 atms. (the required pressure depends upon the material employed) it absorbs great quantities of hydrogen gas. For example, by $LaNi_5$ powder of a compact density of 65%, at a hydrogen gas pressure of 5 atms., 0.080 g of hydrogen gas per cubic cm is absorbed. The density of the hydrogen gas in the material may be of the order of that of liquid hydrogen. For example, this density may correspond with that of hydrogen gas in a hydrogen "flask" at a pressure of 1000 atms.

Figure 2:
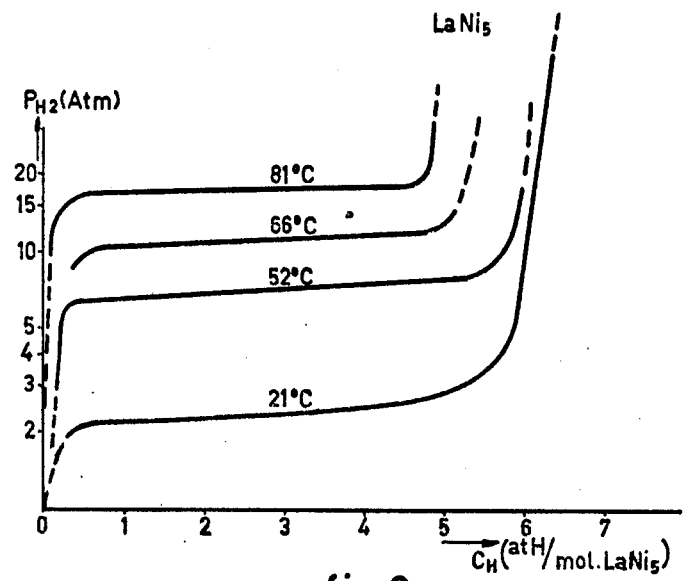
FIG. 2 is a graph showing isotherms for the compound $LaNi_5$.

In the graph of FIG. 2 it is indicated how the isotherms for LaNi$_5$ are shaped, the general course of which is given in FIG. 1.

In order to prevent the hydrogen gas from flowing out of the material, it is necessary to maintain an external hydrogen gas pressure of at least the plateau pressure.

2. The hydrogen gas can be regained in a very simple manner from the materials at room temperature and at atmospheric pressure substantially the whole quantity of hydrogen gas flows out of the material. For example, with LaNi$_5$, 85% of the hydrogen gas flows out within 20 min.—see the graph of FIG. 3.

In the accompanying Table the absorption and desorption properties for hydrogen gas are given for a few materials in accordance with the invention. The measurements concerned have been carried out on materials having a similar average granular size of about 50 $\mu$m at the same temperature, i.e. 21° C., with a charging time of 2 hours and a charging pressure of 60 atms, unless stated otherwise.

Figure 3:
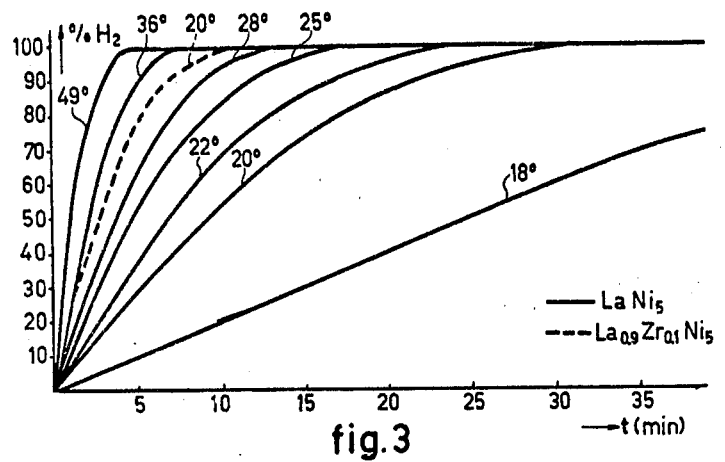
FIG. 3 is a graph showing the rate at which hydrogen is released from the compound $LaNi_5$.

In the graph of FIG. 3 it is indicated to what extent for LaNi$_5$ the quantity of released hydrogen gas depends upon time at different working temperatures and at an external pressure of 1 atm. It is furthermore indicated (dotted curve) which is this dependence at a working temperature of 20° C. for La$_{0.9}$Zr$_{0.1}$Ni$_5$.

It will be apparent from this graph that the speed of the release of hydrogen gas from the material LaNi$_5$ increases with a higher temperature.

Since this graph also provides a release curve for the material La$_{0.9}$ZrNi$_5$ at a temperature of 20° and an external pressure of 1 atm., it also appears that when La is replaced partly by Zr, the hydrogen gas absorption and desorption are accelerated at the same working temperature and external pressure.

It was found that after having been exposed for two hours to a hydrogen gas pressure of 60 atms. at 21° C. some materials according to the invention were not yet saturated. In order to attain saturation the material La$_2$Xi$_9$Cu, for example, was found to require charging for 16 hours, conditions being otherwise the same, whereas this time for YbNi$_5$ even amounted to 100 hours.

It has been found that according as a material according to the invention has absorbed and desorbed hydrogen gas several times, the absorption capacity increases.

This increase is in general slight. However, as indicated in the Table, this increase in absorption capacity of the material SmCo$_5$ is considerable, i.e. about 50%.

The invention furthermore relates to a method of storing, keeping and subsequently releasing hydrogen gas at a given temperature in and out of a material respectively and is characterized in that this material is formed by a material in accordance with the invention, which is exposed for storing the hydrogen gas to a hydrogen gas pressure for a given time, said pressure exceeding the plateau pressure at the working temperature, in that subsequently during the storage of the hydrogen gas the material remains exposed to said hydrogen gas pressure and in that for releasing the hydrogen gas the material is exposed to a hydrogen gas pressure lower than the plateau pressure at the working temperature.

As will be apparent from the graph of FIG. 1 each preselected temperature is associated with a defined plateau hydrogen gas pressure. The minimum pressure required during the process of storing the hydrogen gas—a pressure slightly exceeding the plateau pressure—will therefore depend upon the chosen working temperature and, as will also be apparent from FIG. 1, this pressure will be higher, the higher is the working temperature. Even during storage this external hydrogen gas pressure has to be maintained as a minimum.

During the release of the hydrogen gas from the material the external hydrogen gas pressure has to be slightly lower than the plateau pressure at the temperature concerned.

At room temperature this pressure, for example, for LaNi$_5$ is slightly lower than 4 atms.

The invention also relates to a pressure vessel for storing, keeping and releasing hydrogen gas. Such a pressure vessel comprises a reservoir having an obturable opening and is characterized in accordance with the invention in that the reservoir contains a material according to the invention. As a matter of course the reservoir of the pressure vessel may contain a mixture of materials according to the invention.

Figure 4:
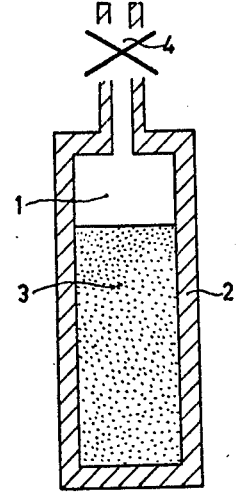
FIG. 4 is a sectional view of a pressure vessel for storing and releasing hydrogen from a compound according to the invention.

Such a pressure vessel is shown schematically in FIG. 4. It comprises a reservoir 1 having a wall 2, the material 3 being held in said reservoir 1. This material can readily absorb and desorb hydrogen gas. The reservoir 1 has an obturable opening 4.

Through the opening 4 hydrogen gas can be passed into the reservoir 1. The material 3 is capable of absorbing the hydrogen gas. When the opening 4 is closed after the hydrogen gas has been introduced into the pressure vessel and has been absorbed by the material 3, the hydrogen gas pressure in the pressure vessel above the material 3 will adjust itself to a given equilibrium. This equilibrium pressure (it being assumed that after saturation of the material 3 no additional hydrogen gas has been led into the vessel) will be slightly higher than the plateau pressure at the working temperature concerned. This pressure of equilibrium keeps the quantity of hydrogen gas in the material 3 constant.

The wall 2 of the reservoir 1 must have such mechanical rigidity that it can withstand the equilibrium pressure prevailing in the vessel. This equilibrium pressure lies below 100 atms for all materials 3, mentioned in accordance with the invention, at room temperature.

The great advantage of a pressure vessel in accordance with the invention as compared with the known hydrogen gas flasks resides in that whereas the pressure to be resisted by the wall of the pressure vessel in accordance with the invention is slightly—and with some materials even considerably—lower than that to be resisted by the wall of said "flask", the quantity of stored hydrogen gas is considerably greater.

By using pressure vessels in accordance with the invention storing and transport of hydrogen gas can be materially simplified, which may mean great saving.

A pressure vessel in accordance with the invention may be employed with machines "employing" hydrogen gas, for example, the cold gas refrigerator and the hot-gas engine, in both of which the hydrogen gas is the working medium. During operation an amount of this gas will constantly leak away and it has to be replenished. Hitherto this has been done by gas stored in a hydrogen gas flask. Particularly with regard to the use of the hot-gas engine in vehicles the advantage of the use of a pressure vessel in accordance with the invention is conspicuous: the quantity of hydrogen gas that can be carried along per unit volume is considerably greater.

One embodiment of a pressure vessel in accordance with the invention is completely filled with LaNi$_5$ powder or the hydride thereof as a hydrogen gas absorbing material.

At room temperature the LaNi$_5$ powder absorbs hydrogen gas at a pressure of, for example, 5 atms. Also a lower pressure provides the desired result.

The pressure of equilibrium attained in the vessel after closure of the inlet opening of the reservoir was slightly lower than 4 atms.

The invention furthermore relates to a method of storing, keeping and subsequently releasing hydrogen gas in and out of a pressure vessel respectively in accordance with the invention. This method is characterized in that through the obturable opening hydrogen gas is introduced into the pressure vessel until the required hydrogen gas pressure is attained therein, which pressure is maintained by the supply of hydrogen gas until the material does no longer absorb hydrogen gas, after which the opening is closed and in that the opening is opened for releasing the hydrogen gas to flow into a space having a hydrogen gas pressure lower than the plateau pressure concerned.

In order to cause the material in the reservoir to absorb hydrogen gas it is necessary to raise the hydrogen gas pressure above said material first to a value slightly exceeding the plateau pressure concerned. When subsequently by the supply of new hydrogen gas this pressure is maintained, the material can be saturated with hydrogen gas. When with the same supply of fresh hydrogen gas the pressure above the material begins to rise, that is to say, when the point of saturation is reached, the inlet opening of the reservoir is closed and said equilibrium pressure establishes in the pressure vessel above the material.

In order to cause the hydrogen gas to flow out the hydrogen gas pressure outside the pressure vessel has to be lower than the equilibrium pressure in the vessel.

It is a particular advantage to be able to use said method at room temperature and in a space of atmospheric pressure.

When the over-all pressure outside the pressure vessel is higher than the equilibrium pressure above the material in the reservoir, whereas the hydrogen gas pressure outside the pressure vessel is lower than the equilibrium pressure, hydrogen gas will flow out of the material out of the opening in the vessel, it is true, but at the same time air will flow through the opening to the inside, with which the emanating hydrogen gas will be so to say diluted.

In a preferred method embodying the invention care is taken to have the hydrogen gas flow out into a space having a total pressure below the plateau pressure concerned.

The materials in accordance with the invention, and particularly those corresponding with the formula La$_x$Ce$_{1-x}$Ni$_5$, wherein x lies between 0.4 and 1 are extremely suitable by their hydrogen absorption capacity for being employed as an electrode in a galvanic cell. These materials are capable of absorbing great volumes of hydrogen gas without involving excessively high pressures. In this frame reference may be made to the use of the materials for safety purposes in nickel-cadmium accumulators in order to avoid the formation of an excessively high hydrogen pressure in storing, charging or discharging.

The following examples illustrate the use of LaNi$_5$ as a hydrogen absorbing electrode in a galvanic cell. A piece of LaNi$_5$ of 6 gs was contacted for 100 hours with 400 mls of a 10% by weight NaCl solution. During this time a development of gas of less than 0.1 ml was stated. Then 35 gs of coarse powdery LaNi$_5$ was introduced into the lower part of a glass vessel, through the bottom of which a carbon rod was passed. An aqueous solution of a 10% by weight solution of NaCl was introduced as an electrolyte and a platinum wire was used as an electrode. On the top side the vessel was provided with a calibrated gas-collecting tube in which any quantity of developed gas could be measured. For 60 minutes a current of 26.8 mA passed through the cell, while LaNi$_5$ formed the cathode. The gas development observed at the cathode was less than 0.1 ml, while the electrical charge passed through the cell corresponded to 11.1 ml of hydrogen gas.

In another experiment the platinum wire was replaced by a zinc electrode. The resultant galvanic cell was short-circuited by a milliammeter. The short-circuit current found was initially 36 mA. After 80 minutes this had dropped to 21 mA. At this instant no measurable gas development could be observed.

TABLE

| AB$_n$H$_m$ | AB$_n$ | cc/H$_2$ per g AB$_n$ | cc H$_2$ of standard pressure and temperature per cc AB$_n$ (70% density) | Plateau pressure at 21° C. in atm. | Particularities |
|---|---|---|---|---|---|
| LaNi$_5$H$_{6.45}$ | LaNi$_5$ | 167 | 900 | 3.5 | See release graph in FIG. 3 |
| La$_{0.95}$Ce$_{0.05}$Ni$_5$H$_{6.85}$ | La$_{0.95}$Ce$_{0.05}$Ni$_5$ | 165 | 880 | 5 | |
| La$_{0.9}$Ce$_{0.1}$Ni$_5$H$_{6.76}$ | La$_{0.9}$Ce$_{0.1}$Ni$_5$ | 175 | 1014 | 3.5 | |
| La$_{0.85}$Ce$_{0.15}$Ni$_5$H$_{6.84}$ | La$_{0.85}$Ce$_{0.15}$Ni$_5$ | 177 | 1033 | 3.5 | |
| La$_{0.80}$Ce$_{0.20}$Ni$_5$H$_{6.95}$ | La$_{0.80}$Ce$_{0.20}$Ni$_5$ | 180 | 1053 | 4.7 | |
| La$_{0.75}$Ce$_{0.25}$Ni$_5$H$_{6.95}$ | La$_{0.75}$Ce$_{0.25}$Ni$_5$ | 180 | 1057 | 4.5 | |
| La$_{0.70}$Ce$_{0.30}$Ni$_5$H$_{7.00}$ | La$_{0.70}$Ce$_{0.30}$Ni$_5$ | 181 | 1064 | 5.5 | |
| La$_{0.65}$Ce$_{0.35}$Ni$_5$H$_{6.72}$ | La$_{0.65}$Ce$_{0.35}$Ni$_5$ | 174 | 1020 | 6.6 | |
| La$_{0.60}$Ce$_{0.40}$Ni$_5$H$_{7.03}$ | La$_{0.60}$Ce$_{0.40}$Ni$_5$ | 182 | 1076 | 9 | |
| La$_{0.50}$Ce$_{0.50}$Ni$_5$H$_{7.15}$ | La$_{0.50}$Ce$_{0.50}$Ni$_5$ | 185 | 1099 | 11.8 | for Ce > 0.45 a maximum charging was found to be obtainable only at a pressure considerably exceeding the plateau pressure. In this example a pressure of 100 atm. was used. |

TABLE-continued

| $AB_nH_m$ | $AB_n$ | $cc/H_2$ per g $AB_n$ | cc $H_2$ of standard pressure and temperature per cc $AB_n$ (70% density) | Plateau pressure at 21° C. in atm. | Particularities |
| --- | --- | --- | --- | --- | --- |
| $La^*_{0.50}Mm_{0.50}Ni_5H_{6.84}$ | $La^*_{0.50}Mm_{0.50}Ni_5$ | 177 | 1042 | 8 | $La^*$ = technically pure La, i.e. 85% by weight of La, 10% by weight of Ce; Mm = mixed metal i.e. >50% by weight of Ce, about 25% by weight of La, remainder further elements of the rare earths. |
| $La_{0.80}Y_{0.20}Ni_5H_{6.79}$ | $La_{0.80}Y_{0.20}Ni_5$ | 180 | 960 | 8 | |
| $La_{0.90}Zr_{0.10}Ni_5H_{6.30}$ | $La_{0.90}Zr_{0.10}Ni_5$ | 165 | 880 | 5 | |
| $LaNi_{4.5}Cu_{0.5}H_{6.21}$ | $LaNi_{4.5}Cu_{0.5}$ | 160 | 865 | 10 | $LaNi_{4.5}Cu_{0.5}$ had to be charged for 16 hours before saturation was reached. |
| $La_{0.5}Ca_{0.5}Ni_5H_{4.99}$ | $La_{0.5}Ca_{0.5}Ni_5$ | 146 | 710 | 15 | |
| $CaNi_5H_{2.98}$ | $CaNi_5$ | 100 | 435 | 15 | |
| $SmCo_5H_{3.02}$ | $SmCo_5$ | 76 | 430 | 4.5 | Maximum charging was reached only after a few repetitions of absorption and desorption |
| $YbNi_5H_{1.46}$ | $YbNi_5$ | 35 | 160 | — | 100 hours of charging |
| $La_{0.50}Sm_{0.50}Ni_{2.5}Co_{2.5}H_{3.36}$ | $La_{0.50}Sm_{0.50}Ni_{2.5}Co_{2.5}$ | 86 | 470 | — | |
| $La^*Ni_5H_{6.45}$ | $La^*Ni_5$ | 180 | 1045 | 2.5 | |

We claim:

1. A hydrogen storage and supply device comprising a pressure vessel having an obturable opening extending from inside said vessel to the atmosphere and, contained in said vessel, a hydride of the gross formula $AB_nH_m$ and capable of reversible dissociation into metal plus hydrogen gas, wherein A is an element selected from the group consisting of calcium, the rare earths, and combinations of one of said elements with one of Th, Zr, and Hf, B is an element selected from the group consisting of Ni and Co, and combinations of said element with one of the elements Fe and Cu, n has a value and lying between about 3 and about 8.5 and m has a value exceeding 0 and up to about 7.

2. The hydrogen storage and supply device of claim 1 wherein the hydride A is lanthanum, B is nickel, and n is 5.

3. The hydrogen storage and supply device of claim 1 wherein in the hydride A is samarium, B is cobalt, and n is 5.

* * * * *